United States Patent
Lott et al.

(10) Patent No.: US 8,831,815 B2
(45) Date of Patent: Sep. 9, 2014

(54) METHOD OF DIAGNOSING A STARTER RELAY FAILURE USING SYNCHRONIZED STATE MACHINE

(75) Inventors: Mark L. Lott, Webberville, MI (US); Toufic R. Rtail, Dearborn, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 0 days.

(21) Appl. No.: 13/560,396

(22) Filed: Jul. 27, 2012

(65) Prior Publication Data

US 2014/0032037 A1   Jan. 30, 2014

(51) Int. Cl.
 *G06F 7/00* (2006.01)
(52) U.S. Cl.
 USPC .................................................... 701/29.2
(58) Field of Classification Search
 USPC ................................................ 701/29, 29.2
 See application file for complete search history.

(56) References Cited

U.S. PATENT DOCUMENTS

| | | | |
|---|---|---|---|
| 3,745,362 A * | 7/1973 | Ballou | 307/10.6 |
| 2003/0080621 A1 * | 5/2003 | Kirk | 307/10.7 |
| 2009/0218988 A1 * | 9/2009 | Richardson et al. | 320/134 |
| 2010/0038158 A1 * | 2/2010 | Whitney et al. | 180/65.265 |
| 2010/0090526 A1 * | 4/2010 | Itou | 307/10.6 |
| 2011/0025124 A1 * | 2/2011 | Brabec | 307/9.1 |
| 2011/0196570 A1 * | 8/2011 | Nakamura | 701/29 |
| 2012/0150382 A1 * | 6/2012 | Bucci et al. | 701/29.6 |
| 2012/0216768 A1 * | 8/2012 | Nakamura | 123/179.3 |

* cited by examiner

*Primary Examiner* — Thomas Tarcza
*Assistant Examiner* — Alex C Dunn
(74) *Attorney, Agent, or Firm* — Ralph E Smith

(57) ABSTRACT

A method and electrical system for detecting and compensating for a failure in a starter circuit that comprises first and second relays in a circuit path to a starter motor of a vehicle. The method and system determine if at least one of the first or second relays is in a closed position when it should be in an open position and disables a vehicle starter operation if it is determined that at least one of the first or second relays is in the closed position when it should be in the open position. The vehicle starter operation could be a stop-start operation of the engine.

17 Claims, 2 Drawing Sheets

METHOD OF DIAGNOSING A STARTER RELAY FAILURE USING SYNCHRONIZED STATE MACHINE

FIELD

The present disclosure relates to vehicle diagnostics, particularly to a method and apparatus for diagnosing a vehicle starter relay failure.

BACKGROUND

Micro-hybrid vehicles are being developed for two primary purposes: (1) reducing carbon-dioxide emissions; and (2) reducing fuel consumption. In most micro-hybrid vehicles, fuel economy is typically improved by about 5 to 10 percent because the vehicle includes stop-start technology that stops the internal combustion engine, and its burning of fuel, when the engine's operation is not required (i.e., when the vehicle is stopped).

Vehicles built with a micro-hybrid architecture de-couple the starter motor from the key ignition switch. The starter is controlled by an engine control module that coordinates the stopping and starting of the engine at the appropriate times. In operation, the engine control module will shut off the engine when the vehicle slows down or comes to a stop. When it is time to restart the engine (e.g., brake pedal released, low battery, cabin comfort or other customer satisfaction or safety related need), the engine control module activates (closes) a starter relay, which then provides an electric circuit path that energizes the starter motor.

A relay failure (e.g., when the contacts are welded in the closed position), however, would result in the starter motor being continuously powered. This could be a dangerous situation. Thus, when the starter relay fails, the engine control module must revert to an "engine always on" mode of operation to avoid potential damage to the starter motor, flywheel or flex plate ring gear and to allow the vehicle to be safely driven to a service facility.

Accordingly, there is a need and desire for a diagnostic mechanism for detecting a vehicle starter relay failure.

SUMMARY

In one form, the present disclosure provides a method of detecting and compensating for a failure in a starter circuit that comprises first and second relays in a circuit path to a starter motor of a vehicle. The method comprises determining if at least one of the first or second relays is in a closed position when it should be in an open position; and disabling a vehicle starter operation if it is determined that at least one of the first or second relays is in the closed position when it should be in the open position.

The present disclosure also provides a vehicle electrical system comprising first and second relays connected between a battery and a starter motor, said first and second relays when in a closed position forming a circuit path from the battery to the starter motor; a first module for controlling the opening and closing of the first relay and for inputting a signal indicative of the state of the circuit path; and a second module connected to the first module via a bus and for controlling the opening and closing of the second relay. The first module performs a diagnostic routine by determining if at least one of the first or second relays is in the closed position when it should be in an open position and disabling a vehicle starter operation if it is determined that at least one of the first or second relays is in the closed position when it should be in the open position.

In one embodiment, the vehicle starter operation is a stop-start operation for the vehicle's engine.

Further areas of applicability of the present disclosure will become apparent from the detailed description provided hereinafter. It should be understood that the detailed description, including disclosed embodiments and drawings, are merely exemplary in nature intended for purposes of illustration only and are not intended to limit the scope of the invention, its application or use. Thus, variations that do not depart from the gist of the invention are intended to be within the scope of the invention.

DETAILED DESCRIPTION

Figure 1:
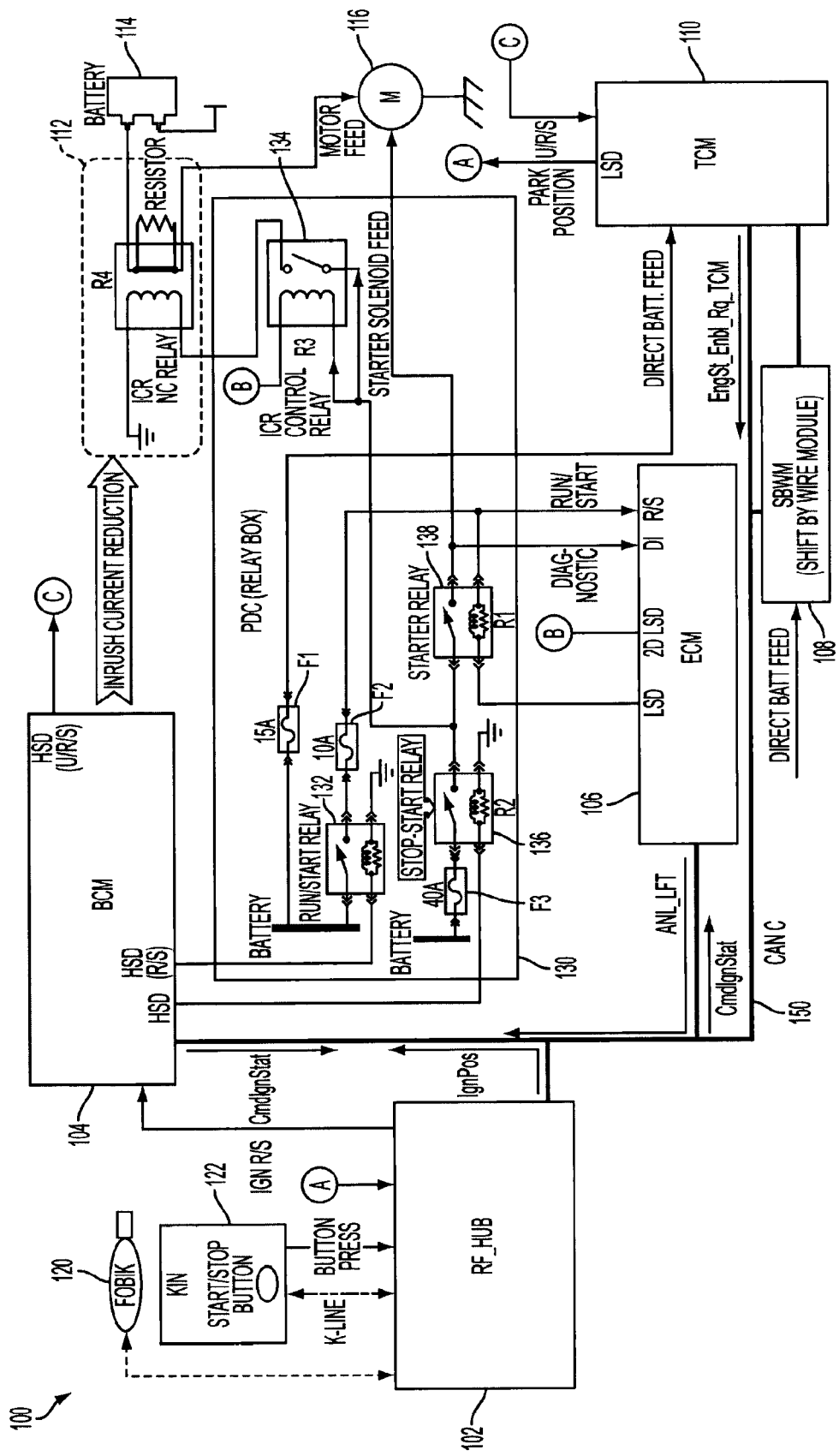
FIG. 1 is a diagram of a vehicle's electrical system in accordance with an embodiment of the present disclosure.

FIG. 1 illustrates a vehicle's electrical system 100 constructed in accordance with an embodiment of the present disclosure. The system includes a radio frequency ("RF") hub 102, a body control module ("BCM") 104, an engine control module ("ECM") 106, a shift by wire module ("SBWM") 108, a transmission control module ("TCM") 110, an inrush current reduction ("ICR") circuit 112, a battery 114, a motor 116 and a power distribution center ("PDC") or relay box 130. The RF hub 102, body control module 104, engine control module 106, shift by wire module 108, and transmission control module 110 communicate over a controller area network ("CAN") bus 150 using CAN messages.

The power distribution center 130 comprises a run/start relay 132, an ICR control relay 134, a stop-start relay 136 and a starter relay 138. Current vehicles do not include the stop-start relay 136 (the significance of which is explained in more detail below). A direct battery feed within the PDC 130 is provided to the transmission control module 110 through a first fuse F1. A direct battery feed is also provided to the shift by wire module 108 and the inrush current reduction circuit 112. The run/start relay 132 is connected to the battery 114 and is controlled by a high side driver run/start ("HSD R/S") signal output from the body control module 104. When activated by the HSD R/S signal from the BCM 104, the run/start relay 132 creates a circuit path from the battery, through a second fuse F2, to a run/start ("R/S") input of the electronic control module 106. As such, when the run/start relay 132 is activated by the HSD R/S signal, the R/S input of the electronic control module 106 receives a Run/Start signal from the relay 132.

The stop-start relay 136 is connected to the battery 114 via a third fuse F3 and is controlled by a high side driver ("HSD") signal output from the body control module 104. When activated by the HSD signal from the BCM 104, the stop-start relay 134 creates a circuit path from the battery, through the third fuse F3, to the starter relay 138 and the ICR control relay 134. The signal from the stop-start relay 134 also activates the ICR control relay 134, which is connected to a second low side driver ("2 d LSD") output of the electronic control module 106. The ICR control relay 134 is used to energize the inrush current reduction circuit 112, which creates a motor feed signal to the motor 116.

The starter relay 138 has one contact connected to receive a first low side driver (LSD) signal from an LSD output of the electronic control module 106. The starter relay 138 has a second contact connected to the R/S input of the electronic control module (discussed above). When activated by the LSD signal, the starter relay 138 creates a circuit path from the output of the stop-start relay 136 to the motor, which serves as a starter solenoid feed signal for the motor 116. The same output from the starter relay 138 serves as a diagnostic signal, which is input at a digital input (DI) of the ECM 106.

The RF hub 102 communicates with a wireless remote or key fob 120 and a key-in-ignition (KIN) start/stop button 122 to determine if a driver is attempting to start the vehicle (i.e., inputs a Button Press indication from button 122). The RF hub 102 also inputs a Park Position indication from the transmission control module 110. It is desired that the vehicle is started only when the Park Position indication reveals that the vehicle is in park. If the RF hub 102 determines that the driver is attempting to start the vehicle and that the transmission is in park, the RF hub 102 sends an ignition run/start ("IGN R/S") signal to the BCM 104 and also places an ignition signal ("IgnPos") over the CAN bus 150. Although other signals and connections are illustrated in FIG. 1, they are not discussed herein as they are not essential in practicing the novel diagnostics discussed below.

As will become apparent, in the illustrated system 100, the starter relay 138 is actuated by the engine control module 106 directly using a low side driver circuit and the additional stop-start relay 136 is actuated by the body control module 104, under the control of the ECM 106 using CAN communications over the CAN bus 150. In a desired embodiment, the starter relay 138 is capable of more fine-grained temporal control than the stop-start relay 136; the exact timing can be controlled with the starter relay 138, whereas the stop-start relay 136 provides more of an "enabling" function.

In the illustrated system, the +12V power to the starter solenoid will be switched through the armatures of both relays 136, 138, such that when both relays 136, 138 are activated, the high side of the solenoid will also be at +12V. If either relay 136, 138 is not activated, the high side of the solenoid will be at 0V (i.e., ground). By reading this voltage, using the digital input (DI) of the ECM 106, and comparing the expected voltage to the actual voltage, an advantageous diagnostic routine can be implemented for diagnosing problems with the relays 136, 138.

Figure 2:
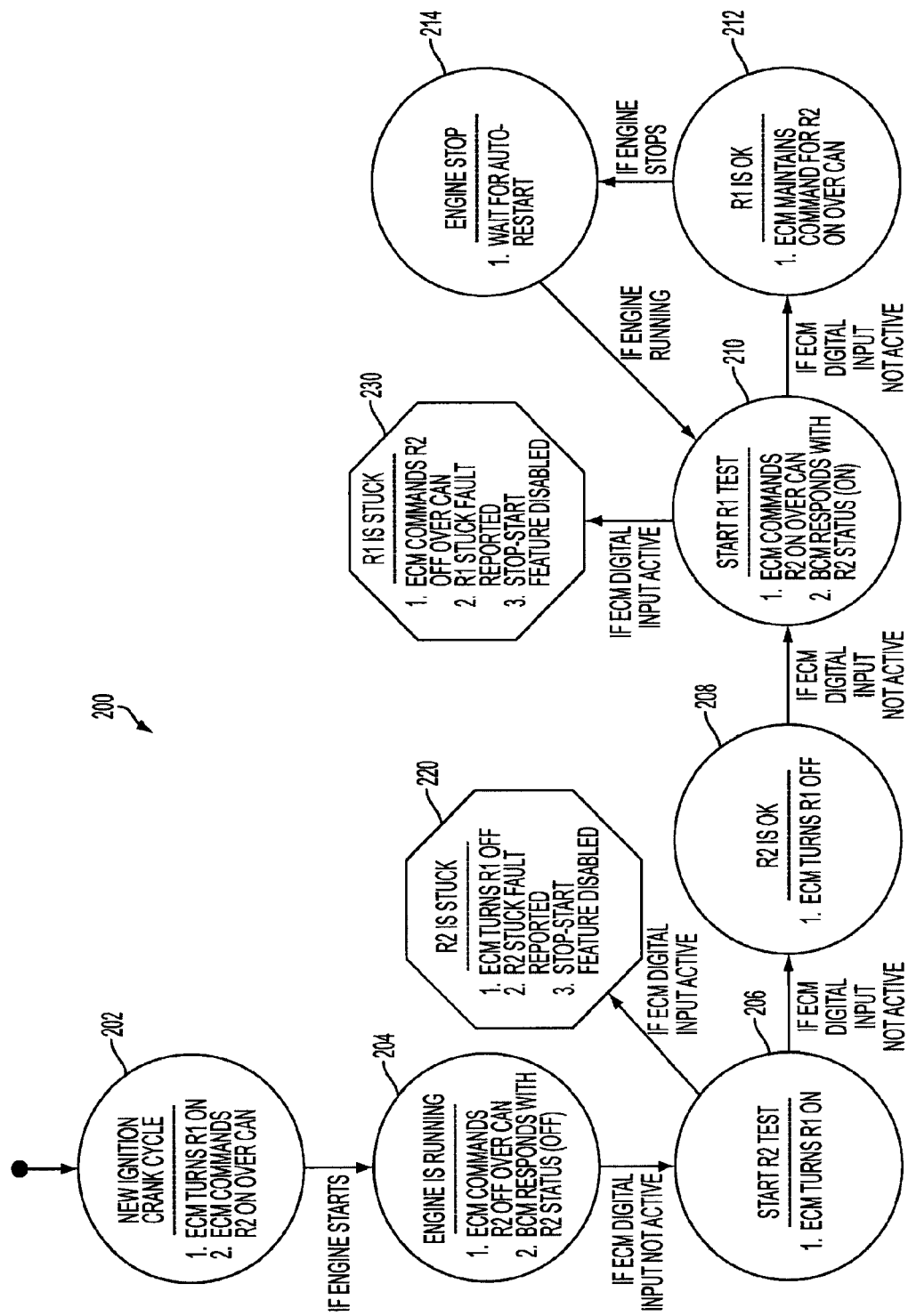
FIG. 2 is a state machine used for performing diagnostics on the FIG. 1 system.

For example, a method of diagnosing a welded-closed condition of either relay 136, 138 can be achieved using a state machine that models the behavior of the starter control and stop-start manager, both of which together control the times at which the engine stops and starts. An example state machine 200 is illustrated in FIG. 2.

The state machine 200 will operate in accordance with the following principles: (1) The state machine 200 will synchronize itself with predictable key events that happen on every drive cycle (i.e., engine start, engine restart, engine stop); (2) After these key events occur, the state machine 200 will request control of the relays 136, 138, and after both relays 136, 138 are turned off, each will be cycled on, then off, separately. If during the time each relay is turned on, a high voltage is detected on the digital input (DI), a fault on the other relay is indicated. If both relays are turned off and a high voltage is detected, a failure of both relays (or a discrete input short to battery) is indicated. (3) The starter control will be able to grant or deny control of the relays 136, 138, so as to not engage the starter when it is inappropriate (or not disengage the starter during an engine start event). (4) If a denied relay control request is encountered, the diagnostic routine will wait a calibratable amount of time for the request to be granted. If the request is not granted, the state machine 200 will return to a wait state, where it will wait for the next key event before attempting to resume the diagnostic process. (5) Any system faults or conditions that prevent the proper operation of the state machine will cause the state machine 200 to return to a dormant state until such time that the disabling faults or conditions are removed. (6) If a welded closed failure of either relay 136, 138 is detected, the start-stop operation and the diagnostic will be disabled for the remainder of the key cycle. The engine will default to a "key start" mode of operation. During engine run mode, both starter relays will be commanded off by the starter control logic. (7) Enable, arm-latch and fail conditions for each relay are determined on a per-state basis. Each relay has a bitmask associated with enabling and failing states so that the states in which the diagnostics pass and fail can be configured, if necessary. (8) At points where a wait time is desired before checking transition conditions, a timer will be reset upon entry into that state, and a wait time threshold must be exceeded before a transition out of the state can proceed. An array of time thresholds with one cell per state exists where the state number is the index into the array. (9) A built-in simulation for failing starter relays will streamline the calibration process. Adjustments in the simulation will allow the latency time between relay command and simulated contact to be set based on actual measurements. The simulation can then be run without risk of damage to the starter or ring gear while setting base calibrations.

The disclosed diagnostics routine will now be discussed with reference to FIGS. 1 and 2. It should be noted that FIG. 2 uses the notation "R1" when referring to the starter relay 138 and "R2" when referring to the stop-start relay 136. At state 202, upon a new ignition crank cycle, the electronic control module 106 enables the starter relay 138 (R1) (via the LSD) and commands the body control module 104 over the CAN bus 150 to enable the stop-start relay 136 (R2). In response, the body control module 104 enables the stop-start relay 136 (via the HSD) and sends a "stop-start relay commanded ON" status over the CAN bus 150.

When the engine is running (state 204), the electronic control module 106 disables the starter relay 138 (via the LSD) and commands the body control module 104 over the CAN bus 150 to disable the stop-start relay 136. The body control module 104 disables the stop-start relay 136 (via the HSD) and sends a "stop-start relay commanded OFF" status over the CAN bus 150. The body control module 104 will diagnose the HSD that controls the stop-start relay 136 and report any fault condition to the ECM 106; in this case, the ECM 106 will bypass the diagnostic steps and disable the Stop-Start feature as is discussed below in more detail.

If the electronic control module's 106 digital input (DI) is not active, then it is time to check the statuses of the relays 136, 138. As such, at state 206, the electronic control module 106 enables the starter relay 138 (via the LSD) to perform a test of the stop-start relay 136. If the digital input (DI) becomes active, then the stop-start relay 136 is stuck and countermeasures need to be taken. Thus, at step 220 the electronic control module 106 disables the starter relay 138 (via the LSD), issues a "stop-start relay stuck fault" over the CAN bus 150, and then disables the vehicles stop-start feature.

If the digital input (DI) does not become active after state 206, then the stop-start relay 136 is functioning properly. The state machine 200 and diagnostic routine continues at step 208, where the electronic control module 106 disables the starter relay 138 (via the LSD). This check will be done once per ignition cycle, after a key start (normal or remote).

If the digital input (DI) does not become active after state 208, the state machine 200 and the diagnostic routine continues at state 210 to initiate a starter relay 138 test. During this state, the electronic control module 106 commands the body control module 104 over the CAN bus 150 to enable the stop-start relay 136. The body control module 104 responds over the CAN bus 150 with a "stop-start relay commanded ON" status.

If after state 210 the digital input (DI) becomes active, then the starter relay 138 is stuck. At state 230, the electronic control module 106 commands the body control module 104 (over the CAN bus 150) to disable the stop-start relay 136, issues a "starter relay stuck fault" and disables the vehicle's stop-start feature. If after state 210 the digital input (DI) did not become active, then the starter relay 138 is functioning properly. At state 212, the electronic control module 106 maintains the enable stop-start relay 136 command for the body control module 104 over the CAN bus 150 for the remainder of the key cycle. This check will be done after key start (normal or remote) and every auto restart event. State 214 (i.e., waiting for an automatic restart event) occurs if the engine stopped after state 212. If the engine restarts at state 214, the state machine 200 continues at step 210. The ECM 106 will constantly monitor its digital input (DI) after passing the diagnostic check; if the DI becomes active by any uncontrolled cause, the ECM 106 will set a rationality fault, command the stop-start relay 136 off and disable the stop-start feature.

It should be appreciated that the above-described diagnostic routine interacts with the vehicle's stop-start process (if stop-start equipped). The following is a list of example interactions. It should be appreciated that the disclosure is not limited solely to the items in the following list.

(1) The electronic control module 106 disables the stop-start feature and exits the diagnostic routine if the body control module 104 reports a stop-start relay fault; (2) If the engine is running and the starter relay 138 driver is shorted to ground, the electronic control module 106 will command the stop-start relay 136 off (over the CAN bus 150), disable the stop-start feature and exit the diagnostic routine; (3) If the engine is running and the starter relay 138 driver is faulted with an open circuit, a short to battery or over-temperature, the stop-start feature is disabled and the diagnostic routine is exited; (4) If the engine is running and the ICR control relay 134 driver is faulted with a short to ground, an open circuit, a short to battery or over-temperature, the stop-start feature is disabled; (5) If the vehicle is in an Auto-Stop mode and the starter relay 138 driver is shorted to ground, the electronic control module 106 will command the stop-start relay 136 off (over the CAN bus 150), disable the stop-start feature and exit the diagnostic routine; (6) If the vehicle is in Auto-Stop mode and the starter relay 138 driver is faulted with an open circuit, a short to battery or over-temperature, the stop-start feature is disabled and the diagnostic check is exited; (7) If the vehicle is in Auto-Stop mode and the ICR control relay 134 driver is faulted with a short to ground, an open circuit, a short to battery or over-temperature, the stop-start feature is disabled; and (8) If the stop-start relay 136 command signal from the electronic control module 106 is not received by the body control module 104 (over the CAN bus 150) and the ignition status is "Run" or "Start", the body control module 104 will keep its last known state.

Thus, by including an additional relay (i.e., the stop-start relay 136) and a diagnostic input within traditional starter control circuitry, the disclosed embodiments provide the ability to detect and compensate for starter relay failures (and other failures) that could be dangerous to the vehicle. The use of more than one relay to operate the starter motor provides a mechanism for disabling the starter if one relay becomes welded closed, which provides an added measure of equipment protection, and also provides a means for the vehicle to be started and driven to a service facility (by placing the vehicle in key-start mode and leaving it in engine always on mode). The disclosed principles can identify precisely which relay has failed and can also simulate a failure on command to assist with calibration.

What is claimed is:

1. A method of detecting and compensating for a failure in a starter circuit that comprises first and second relays in a circuit path between a battery and a starter motor of a vehicle, said method comprising:
   monitoring the first and second relays in the circuit path to determine if at least one of the first or second relays is in a closed position when it should be in an open position; and
   disabling a vehicle starter operation if it is determined that at least one of the first or second relays is in the closed position when it should be in the open position.

2. The method of claim 1, wherein the monitoring step comprises:
   attempting to open the second relay while the first relay is in the closed position;
   determining whether the circuit path to the starter motor is opened or closed; and
   reporting a failure of the second relay if it is determined that the circuit path is closed.

3. The method of claim 2, wherein determining whether the circuit path to the starter motor is opened or closed is performed by checking a voltage of the circuit path at a point between the relays and the starter motor.

4. The method of claim 2, wherein if it is determined that the circuit path is open, said method further comprises:
   closing the second relay;
   attempting to open the first relay while the second relay is in the closed position;
   determining whether the circuit path to the starter motor is opened or closed; and
   reporting a failure of the first relay if it is determined that the circuit path is closed.

5. The method of claim 4, wherein determining whether the circuit path to the starter motor is opened or closed is performed by checking a voltage of the circuit path at a point between the relays and the starter motor.

6. The method of claim 4, further comprising repeating said steps of closing the second relay; attempting to open the first relay while the second relay is in the closed position; and determining whether the circuit path to the starter motor is opened or closed while the engine is running or until it is determined that the circuit path to the starter becomes closed.

7. The method of claim 1, wherein said monitoring step is repeated for engine start, restart and stop events of the vehicle.

8. The method of claim 1, wherein the vehicle starter operation is a stop-start operation.

9. A vehicle electrical system comprising:
   first and second relays connected between a battery and a starter motor, said first and second relays when in a closed position forming a circuit path from the battery to the starter motor;
   a first module for controlling the opening and closing of the first relay and for inputting a signal indicative of the state of the circuit path; and a second module connected to the first module via a bus and for controlling the opening and closing of the second relay, said first module performing a diagnostic routine by determining if at least one of the first or second relays is in the closed position when it should be in an open position and disabling a vehicle starter operation if it is determined that at least one of the first or second relays is in the closed position when it should be in the open position.

10. The system of claim 9, wherein the first module determines if at least one of the first or second relays is in the closed position when it should be in the open position by:

closing the first relay;

sending a command to the second module to open the second relay; determining whether the circuit path to the starter motor is opened or closed; and reporting a failure of the second relay if it is determined that the circuit path is closed.

11. The system of claim 10, wherein determining whether the circuit path to the starter motor is opened or closed is performed by the first module by checking the input signal to see if there is a voltage from the circuit path.

12. The system of claim 10, wherein if the first module determines that the circuit path is open, said first module:

commands the second module to close the second relay;

attempts to open the first relay;

determines whether the circuit path to the starter motor is opened or closed; and reports a failure of the first relay if it is determined that the circuit path is closed.

13. The system of claim 12, wherein determining whether the circuit path to the starter motor is opened or closed is performed by the first module by checking the input signal to see if there is a voltage from the circuit path.

14. The system of claim 12, wherein the first module repeats commanding the closing of the second relay; attempting to open the first relay; and determining whether the circuit path to the starter motor is opened or closed while the engine is running or until it is determined that the circuit path to the starter becomes closed.

15. The system of claim 9, wherein the first module repeats the diagnostic routine for engine start, restart and stop events of the vehicle.

16. The system of claim 9, wherein the vehicle starter operation is a stop-start operation.

17. The system of claim 9, wherein the bus is a controller area network.

* * * * *